United States Patent
Murase et al.

(10) Patent No.: US 9,141,732 B2
(45) Date of Patent: Sep. 22, 2015

(54) SIMULATION EXECUTION METHOD, PROGRAM, AND SYSTEM

(71) Applicant: International Business Machines Corporation, Armonk, NY (US)

(72) Inventors: Masana Murase, Tokyo (JP); Shu Shimizu, Tokyo (JP); Gang Zhang, Kanagawa (JP)

(73) Assignee: International Business Machines Corporation, Armonk, NY (US)

(*) Notice: Subject to any disclaimer, the term of this patent is extended or adjusted under 35 U.S.C. 154(b) by 351 days.

(21) Appl. No.: 13/690,592

(22) Filed: Nov. 30, 2012

(65) Prior Publication Data

US 2013/0185034 A1 Jul. 18, 2013

(30) Foreign Application Priority Data

Dec. 5, 2011 (JP) ................................. 2011-265413

(51) Int. Cl.
*G06F 17/50* (2006.01)
*G06F 11/26* (2006.01)

(52) U.S. Cl.
CPC .......... *G06F 17/5009* (2013.01); *G06F 11/261* (2013.01); *G06F 17/5022* (2013.01); *G06F 2217/86* (2013.01)

(58) Field of Classification Search
CPC ... G06F 17/50; G06F 15/177; G06F 17/5009; G06F 9/455; G06Q 99/00; H04B 7/00
USPC ............ 703/13, 17; 705/1; 370/310; 709/221
See application file for complete search history.

(56) References Cited

U.S. PATENT DOCUMENTS

| 7,564,809 | B1 * | 7/2009 | Manohar et al. | 370/310 |
| 7,774,440 | B1 * | 8/2010 | Bagrodia et al. | 709/221 |
| 2004/0024578 | A1 * | 2/2004 | Szymanski et al. | 703/17 |
| 2006/0149582 | A1 * | 7/2006 | Hawkins | 705/1 |
| 2009/0306952 | A1 * | 12/2009 | Kajitani et al. | 703/13 |

OTHER PUBLICATIONS

English language abstract of Japanese Publication No. 10-198707, dated Jul. 31, 1998.
English language abstract of Japanese Publication No. 2010-002968 dated Jan. 7, 2010.
Japanese Search Report and Written Opinion, dated Feb. 15, 2013.
Ferscha, et al., "Parallel and Distributed Simulation of Discrete Event Systems," the University of Maryland Computer Science Department; CS-TR-3336, Oct. 15, 1998, pp. 1-51.
Jha, et al., "Simultaneous events and lookahead in simulation protocols," Journal ACM Transactions on Modeling and Computer Simulation, vol. 10 Issue 3, Jul. 2000, pp. 241-267.

* cited by examiner

*Primary Examiner* — Kandasamy Thangavelu
(74) *Attorney, Agent, or Firm* — Scully, Scott, Murphy & Presser, P.C.; Jennifer R. Davis, Esq.

(57) ABSTRACT

A technique for increasing the speed of parallel running of logical processes without sacrificing the accuracy of data update timing in a parallel discrete event simulation system. A logical process involving a longer receiving time lag than that of sending is executed by an amount of initial shift for a predetermined period before the simulation. The initial shift is set to be one-half of a value of difference between the receiving time lag and the sending time lag. The logical process executed with timing displaced by the amount of initial shift runs by exchanging null messages with each other. Each null message is delivered to a correspondent logical process after the predetermined time lag, and each logical process further sends the correspondent logical process a null message upon receipt of the null message. Thus, there is a progression of simulation by synchronizing them through the null messages.

20 Claims, 11 Drawing Sheets

FIG. 1

(1) NO TIME LAG (2) PRESENCE OF TIME LAGS ($L_{AB}>0$, $L_{BA}>0$)

(3) NO TIME LAG IN ONE DIRECTION ONLY

FIG. 15A NO INITIAL SHIFT

FIG. 15B INITIAL SHIFT ONE-HALF OF TIME-LAG DIFFERENCE

FIG. 15C INITIAL SHIFT MORE THAN ONE-HALF OF TIME-LAG DIFFERENCE

FIG. 15D INITIAL SHIFT LESS THAN ONE-HALF OF TIME-LAG DIFFERENCE

FIG. 16A

NO INITIAL SHIFT

FIG. 16B

INITIAL SHIFT ONE-HALF OF TIME-LAG DIFFERENCE

FIG. 16C

INITIAL SHIFT MORE THAN ONE-HALF OF TIME-LAG DIFFERENCE

FIG. 16D

INITIAL SHIFT LESS THAN ONE-HALF OF TIME-LAG DIFFERENCE

SIMULATION EXECUTION METHOD, PROGRAM, AND SYSTEM

FIELD OF THE INVENTION

This invention relates to a technique for executing a simulation of an automobile control system or the like.

BACKGROUND ART

Recently, a so-called multiprocessor system having multiple processors has been used in the fields of scientific computation, simulation and the like. Meanwhile, in the field of simulation, the development of which has been particularly facilitated only recently, there is simulation software for plants of mechatronics products, such as robots, automobiles, and airplanes. With the benefit of the development of electronic components and software technology, most parts of a robot, an automobile, an airplane, and the like are electronically controlled by using wire connections laid like a network of nerves, a wireless LAN, or the like.

Although these are mechatronics devices in nature, they also incorporate large amounts of control software. Therefore, the development of such a product has required to spend a long time period, enormous costs and a large pool of manpower to develop a control program and test the program.

As a conventional technique for such a test, there is HILS (Hardware In the Loop Simulation). Particularly, an environment for testing all the electronic control units (ECUs) in an automobile is called full-vehicle HILS. In the full-vehicle HILS, a test is conducted in a laboratory according to a predetermined scenario by connecting a real ECU to a dedicated hardware device emulating an engine, a transmission mechanism, or the like. The output from the ECU is input to a monitoring computer, and further displayed on a display to allow a person in charge of the test to view the display in order to check if there is any abnormal action.

However, in HILS, the dedicated hardware device is used, and the device and the real ECU have to be physically wired. Thus, HILS involves a lot of preparation. Further, when a test is conducted by replacing the ECU with another, the device and the ECU have to be physically reconnected, requiring even more work. Further, since the test uses the real ECU, it takes an actual time to conduct the test. Therefore, it takes an immense amount of time to test many scenarios. In addition, the hardware device for emulation of HILS is generally very expensive.

Therefore, there has recently been proposed a technique for configuring the entire simulation in software without using such an expensive emulation hardware device. In the technique, continuous simulation is used for plant parts, such as engines or transmissions, and a state chart or actual software code is used for controller parts. Depending on the simulation method for the controller parts, the former is called MIL (Model-in-the-Loop) simulation, and the latter is called SIL (Software-in-the-Loop) simulation. According to MIL or SIL, a test can be conducted without the hardware of any ECU.

As a system for supporting such a configuration of MIL/SIL, for example, there is a simulation modeling system, MATLAB®/Simulink® available from Mathworks Inc. In the case of using MATLAB®/Simulink®, functional blocks are arranged on a screen through a graphical interface, and a flow of processing is specified, thereby enabling the creation of a simulation program. Here, the functional blocks include the types of blocks for invoking basic operations such as addition and multiplication, integration, conditional branching, and further software code, and each block has input and/or output, respectively. The simulation including software blocks as the expression of a controller is SIL.

In the following description, when the units of such simulation are coupled together, each simulator is called a logical process. As a method of operating a coupled simulation system composed of multiple logical processes, parallel discrete event simulation is known. For example, Non-Patent Document 1 discloses a parallel discrete event simulation method using multiple logical processes. According to this paper, it is shown that the causality just has to be preserved locally in each logical process to avoid timing inconsistencies in the system and to guarantee the preservation of event causalities across logical processes. Since system-wide synchronous processing is unnecessary, no synchronous overhead is required.

Figure 1:
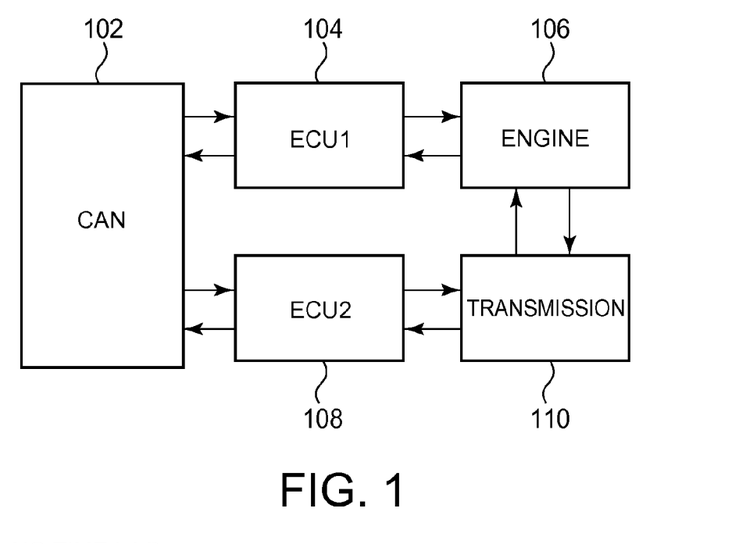
FIG. 1 is a block diagram showing a simulation system composed of multiple logical processes.

FIG. 1 is a block diagram showing part of the configuration of an automotive simulation system composed of multiple logical processes. The system in FIG. 1 has a CAN emulator 102, an ECU emulator 104, an engine simulator 106, an ECU emulator 108, and a transmission simulator 110, each of which is a logical process implemented in software. In FIG. 1, the logical processes work in cooperation with each other while exchanging messages to give notice of events.

Time information is added to each event, and this means a simulation time at which a logical process on the receiving side performs processing. In the event time information, it is not allowed to set a time older than the simulation time of a logical process on the sending side. This is because past-time processing cannot be requested. If parts are interconnected through a network, since transmission therebetween is delayed, the receiving time shall be larger in value than the sending time. In a case of performing processing by using a timer function or the like, a time difference can be provided between the time (send) at which the timer is set and the time (receive) of generating an alarm, or if the receiving side allows for a certain amount of delay, the allowed range can be set as the time difference.

Figure 2:
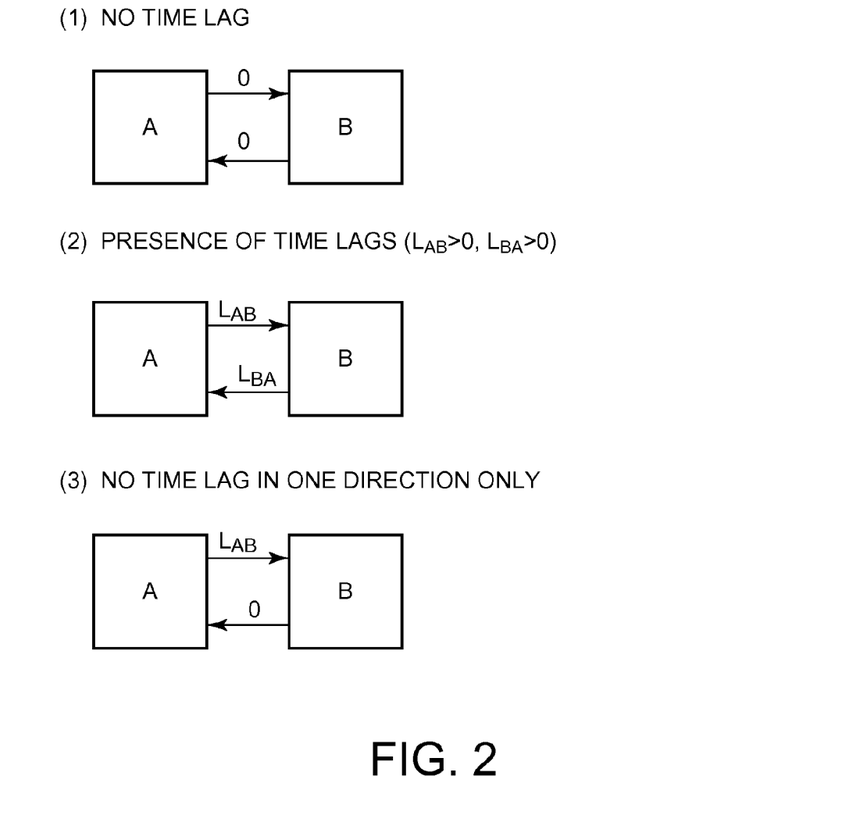
FIG. 2 is a diagram showing patterns of communication time lags between logical processes.

In regard to event communication between two logical processes A and B, time differences between the send time and the receive time are classified into time lags and schematically shown in FIG. 2.

FIG. 2(1) is the case with no time lag, showing a strong-coupled structure in which A and B cannot be executed in parallel. This case cannot be divided into different logical processes, and hence required to perform calculations as a single simulator. If the structure allows for some errors and A and B are executed in parallel every short time period, it will be weak-coupled simulation.

FIG. 2(2) shows a case where both time lag $L_{AB}$ from A to B and time lag $L_{BA}$ from B to A are not zero. In this case, synchronous processing is performed with a time step of the greatest common divisor thereof to enable coupled simulation without time error even in parallel operations.

FIG. 2(3) shows a case where the time lag $L_{AB}$ from A to B is not zero but the time lag $L_{BA}$ from B to A is virtually zero. In this case, it is expected every moment to update data in the direction from B to A, A cannot move forward even one step until an event is notified from B. Therefore, both have no choice but to achieve sequential running alternately, lowering the execution speed.

In the case of FIG. 2(3), for example, logical process A is an ECU emulator and logical process B is a plant simulator. The case of FIG. 2(3) can also occur in the sense that data transmission is performed immediately even between ECU emulators and between plant simulators but data reception involves a communication delay. A similar problem can also arise if the time lag is not zero but very small.

Since the case of FIG. 2(3) often appears in the parallel discrete event simulation system using logical processes, a method of enabling parallel execution in the case of FIG. 2(3) is desired.

To prevent the logical processes from waiting for events from each other and hence causing deadlock, a technique using a null message is known. However, when the time lag is zero, no future time is given to the null message, deadlock is not caused but parallel execution cannot be achieved.

Non-Patent Document 2 provides a technique called $\epsilon$-lookahead execution to such a problem, giving one solution. In other words, $\epsilon$-lookahead execution is a method of running processes in parallel in the system of FIG. 2(2) on the assumption that there is a time lag of $\epsilon$ as close to zero as possible. In this case, errors are accumulated due to inaccurate data switching timings. In order to increase accuracy, it is necessary to reduce the value of $\epsilon$, but when it happens, the execution speed is reduced, resulting in a tradeoff between accuracy and execution speed.

PRIOR ART REFERENCES

Non-Patent Documents

[Non-Patent Document 1]
Alois Ferscha, Satish K. Tripathi, "Parallel and Distributed Simulation of Discrete Event Systems," the University of Maryland Computer Science Department; CS-TR-3336, 15 Oct. 1998.
[Non-Patent Document 2]
Vikas Jha, Rajive Bagrodia, "Simultaneous events and lookahead in simulation protocols," Journal ACM Transactions on Modeling and Computer Simulation, Volume 10 Issue 3, July 2000.

SUMMARY OF THE INVENTION

Problem to be Solved by the Invention

It is an object of this invention to provide a technique for increasing the speed of parallel running of logical processes without sacrificing the accuracy of data update timing in a parallel discrete event simulation system using logical processes.

Means for Solving the Problems

This invention has been made to solve the above problem, characterized in that a logical process with a longer time lag of the input side than the output side is executed by an amount of initial shift for a predetermined period before the start of the entire simulation. It is preferred to set the initial shift to be one-half of a value of difference between the input time lag and the output time lag.

The logical process started first (called logical process B) sends a null message to a correspondent logical process (called logical process A) when the period of initial shift has elapsed. On the other hand, logical process A also sends a null message to logical process B at the start of the execution. Each of the null messages arrives immediately in real time, and each logical process further sends the correspondent logical process a null message upon receipt of the null message. Thus, there is a progression of simulation by synchronizing them through the null messages.

In general, a simulation system includes many logical processes. Therefore, the decision on the initial shift based on a pair of logical processes is not sufficient, and it is necessary to determine relative shift amounts between all pairs of logical processes communicating with each other without contradictions. Therefore, the system according to the present invention solves simultaneous equations for initial shift differences made based on a binary relationship between pairs of logical processes. Then, the value of initial shift obtained as a result of this calculation is set in each logical process.

At this time, the simultaneous equations may not be solved for some reason, such as that the number of equations exceeds the number of variables in the simultaneous equations. In such a case, the equations are reduced in number or the like based on preconditions such as predetermined preference between logical processes to obtain a solution.

Advantage of the Invention

This invention advantageously provided a technique for increasing the speed of parallel running of logical processes without sacrificing the accuracy of data update timing in a parallel discrete event simulation system.

BRIEF DESCRIPTION OF THE DRAWINGS

FIG. 13A(1) shows a resulting operation chart given example time lags among three processes A, B and C as shown in FIG. 13A(2);

FIG. 13B(1) shows a resulting operation chart given initial time shifts computed for three processes A, B and C as shown in FIG. 13B(2);

FIG. 14A(1) shows a resulting operation chart given example time lags among three processes A, B and C as shown in FIG. 14A(2);

FIG. 14B(1) shows a resulting operation chart given initial time shifts computed for three processes A, B and C as shown in FIG. 14B(2);

FIG. 16 A shows the operation of processes A, B in the conventional case without initial shift;

MODE FOR CARRYING OUT THE INVENTION

The configuration and processing of one preferred embodiment of the present invention will now be described with reference to the accompanying drawings. In the following description, the same components are denoted by the same reference numerals throughout the drawings unless otherwise noted. Although the following will describe the configuration and processing as one embodiment, it should be understood that the technical scope of the present invention is not intended to be limited to this embodiment.

Figure 3:
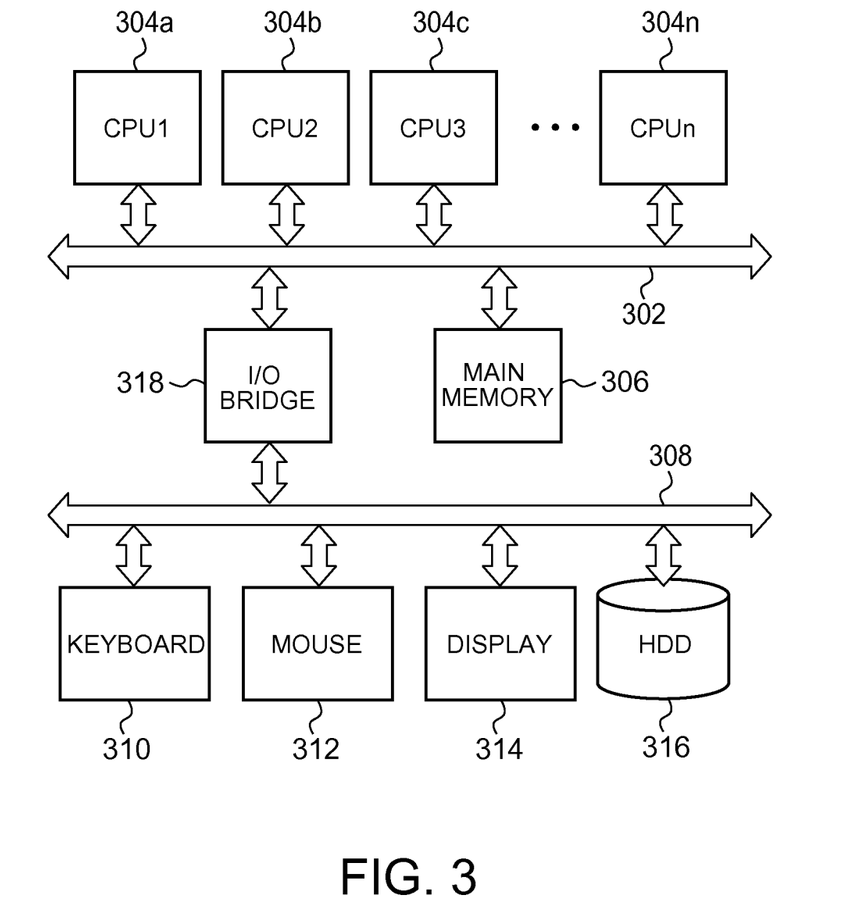
FIG. 3 is a block diagram of a hardware configuration.

First, the hardware of a computer used to carry out the present invention will be described with reference to FIG. 3. In FIG. 3, multiple CPUs, i.e., CPU1 304a, CPU2 304b, CPU3 304c, . . . , CPUn 304n are connected to a host bus 302. A main memory 306 is also connected to the host bus 302 for arithmetic processing performed by the CPU1 304a, CPU2 304b, CPU3 304c, . . . , CPUn 304n.

On the other hand, a keyboard 310, a mouse 312, a display 314, and a hard disk drive 316 are connected to an I/O bus 308. The I/O bus 308 is connected to the host bus 302 through an I/O bridge 318. The keyboard 310 and the mouse 312 are used by a human operator to perform operations, such as to enter a command and click on a menu. The display 314 is used to display menus used as needed to operate a program according to the present invention on a GUI.

IBM® System X can be used as the hardware of a computer system suitable for this purpose. In this case, for example, the CPU1 304a, CPU2 304b, CPU3 304c, . . . , CPUn 304n are Intel® Xeon®, and the operating system is Windows® Server 2003. The operating system is stored in the hard disk drive 316, and read from the hard disk drive 316 into the main memory 306 upon startup of the computer system.

Use of a multiprocessor system is not indispensable for carrying out the present invention, but it is desired to use the multiprocessor system in order to allocate multiple logical processes to different processors and run the processes in parallel. Here, since the multiprocessor system is generally intended to be a system using a processor having multiple cores of processor functions capable of achieving arithmetic processing independently, it should be understood that the multiprocessor system may be a multi-core single-processor system, a single-core multiprocessor system, or a multi-core multiprocessor system.

Note that the hardware of the computer system usable for carrying out the present invention is not limited to IBM® System X. Any other computer system can be used as long as a simulation program of the present invention can run thereon. The operating system can also be any operating system, such as Windows® XP, Windows® 7, Linux®, Mac OS®, or the like. Further, a POWER™ 6-based computer system such as IBM® System P with operating system AIX™ may also be used for high-speed running of the simulation program.

As will be described later with reference to FIG. 4, a main program 402, a simulation modeling tool 404 such as MATLAB®/Simulink®, a simulator module (library) 406 for step-by-step execution, a connection information file 408 described in XML and including information on time lags, preference, and the like between the logical processes, a shift amount calculating module 410 for calculating the initial shift amount of the simulator module 406, and a local scheduler module 412 are stored in the hard disk drive 316. The shift amount calculating module 410 can be created in any existing programming language, such as Java®, C, C++, or C#. A compiler/linker 416 for compiling and linking the library 406, the local schedule 412, and the like to generate an executable file 418 is also stored in the hard disk drive 316.

Figure 4:
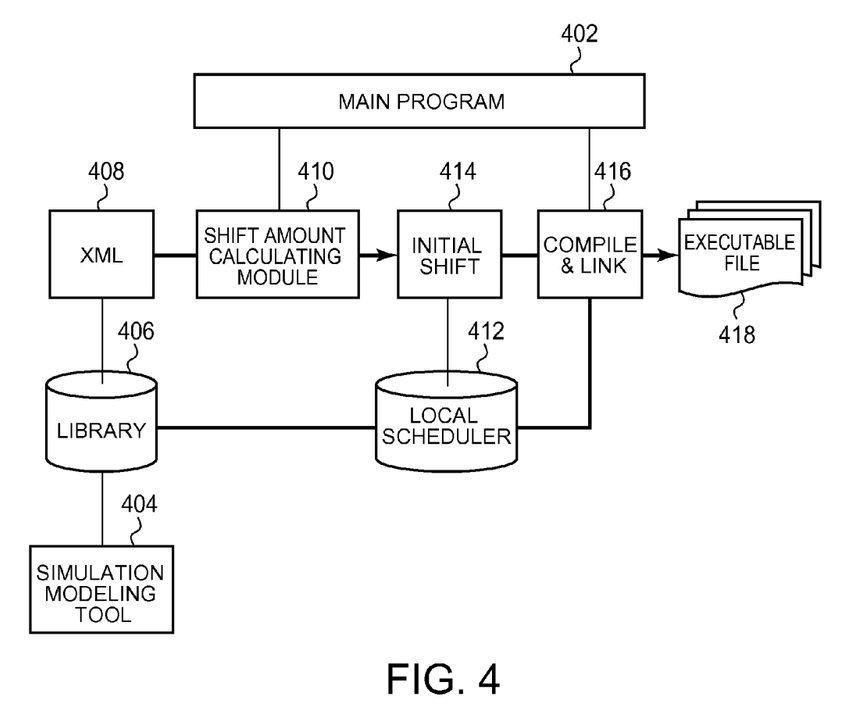
FIG. 4 is a block diagram of a functional configuration.

FIG. 4 is a functional block diagram according to the embodiment of the present invention. In FIG. 4, the main routine 402 is a program for calling various modules for processing according to the present invention, which preferably provides an interface such as a GUI on the display 314 to perform processing with operations of the keyboard 310 and the mouse 312.

Preferably, the simulation modeling tool 404 is, but not limited to, MATLAB®/Simulink®. Any other simulation modeling tool such as Scilab/Scicos can also be used.

The library 406 of the step-by-step execution module is code created by the simulation modeling tool 404, which is preferably converted to source code, such as C or C++, by a conversion tool such as Real-Time Workshop® in MATLAB®/Simulink® and converted into the executable file 418 by the compiler/linker 416 to execute the code of the executable file 418 in an execution environment implemented by the hardware configuration, the operating system, and the like, shown in FIG. 3.

The operational units of simulation, such as the CAN emulator, the ECU emulator, the engine simulator, and the transmission simulator shown in FIG. 1 are called logical processes. In general, one logical process consists of multiple functional blocks created by the simulation modeling tool 404.

In the execution environment having the multiprocessor system shown in FIG. 3, it is preferred that one logical process be allocated to one processor or core whenever possible and executed in parallel.

The logical process is composed of a local scheduler having the function of receiving or sending a message and a user-defined function to control the computation of time steps. In the local scheduler, an initial shift amount 414 at the time of starting the logical process can be set by the main program 402.

In the present invention, a given initial shift amount calculated is set in the local scheduler 412 of each individual logical process to improve the execution speed of the simulation. The details of processing performed by the local scheduler will be described later.

The shift amount calculating module 410 has the function of calculating the shift amount 414 to be set in each individual logical process by using the data 408 of connection information including time lags in respective communication directions between logical processes communicating with each other and preference conditions related to communication conditions between the logical processes. The shift amount calculating module 410 basically performs processing for making linear equations for each pair of logical processes communicating with each other and solving the simultaneous equations to calculate the shift amount to be set in each logical process. The details of this processing will be described later with reference to a flowchart of FIG. 6.

Figure 5:
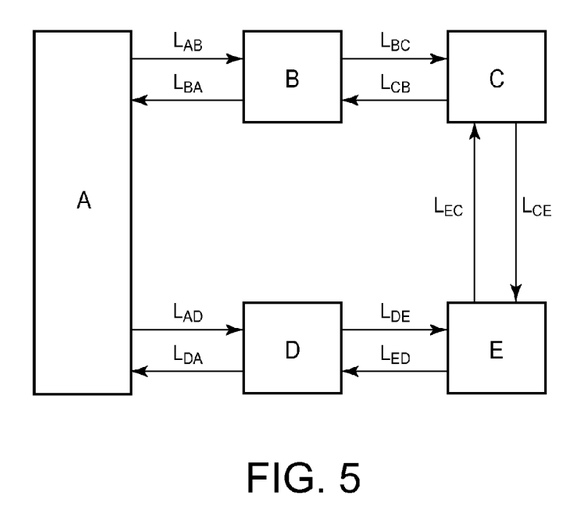
FIG. 5 is a diagram showing time lags between logical processes in a simulation system composed of multiple logical processes.

FIG. 5 illustrates data on time lags. Suppose that there are logical processes A, B, C, D, and E. In this case, between logical processes A and B communicating with each other, time lag $L_{AB}$ of sending a message from logical process A to logical process B and time lag $L_{BA}$ of sending a message from logical process B to logical process A are recorded in XML into the connection information file 408 as time lag data. Similar recording is done between logical processes A and D, between logical processes B and C, between logical processes C and E, and between logical processes D and E.

When such time lags occur between the CAN and the ECU, it means a receive delay at CAN (to wait until transfer of the data size is completed). A delay of sending a message from the ECU to the plant is caused by the operating program on the ECU. The program on the ECU sends an instruction to the plant using a timer, and the length of this timer becomes a time lag. On the other hand, the time lag from the plant to the ECU is zero. Further, a time acceptable to transmit each other's changes corresponds to the time lag between plants.

The preference data is, for example, to describe coupling restrictions capable of being relaxed between plants. The coupling restrictions capable of being relaxed include a value of the minimum synchronous cycle. When the coupling restrictions are relaxed, since an adjustment is made not to exceed the minimum synchronous cycle, this is not meant to increase the accumulated errors in the entire system.

The main program 402 sets the shift amount 414 in each logical process through the local scheduler 412 and instructs the logical process to run.

Next, processing performed by the shift amount calculating module 410 will be described with reference to the flowchart of FIG. 6. First, equations calculated by the shift amount calculating module 410 will be described. If $S_A$ expresses the initial shift amount of logical process A, $S_B$ expresses the initial shift amount of logical process B, $L_{BA}$ expresses the time lag of sending a message from logical process B to logical process A, and $L_{AB}$ expresses the time lag of sending a message from logical process A to logical process B, an equation is made as $S_A - S_B = (L_{BA} - L_{AB})/2$. Similarly, when $S_A$ to $S_Z$ is formulated in logical processes exchanging messages with each other, the following simultaneous equations are obtained:

$$S_A - S_B = \frac{L_{BA} - L_{AB}}{2} \quad [\text{Math 1}]$$

$$S_B - S_C = \frac{L_{CB} - L_{BC}}{2}$$

$$\ldots$$

$$S_R - S_Z = \frac{L_{ZR} - L_{RZ}}{2}$$

$$S_A = C$$

Note that the undermost equation $S_A = C$ means that $S_A$ is selected as a temporary basis for calculating the initial shift amount. This basis is corrected to a right basis in subsequent processing.

If the above description is generalized to express $S_A$ to $S_Z$ as $S_1$ to $S_n$ and express the right sides of the simultaneous equations as $b_1$ to $b_m$, the simultaneous equations are expressed in a matrix as follows:

$$As = b$$

wherein $$s = [S_1, S_2, \ldots, S_n]^T$$

$$b = [b_1, b_2, \ldots, b_m]^T$$

$$A : m \times n (m \geq n) \quad [\text{Math 2}]$$

Figure 6:
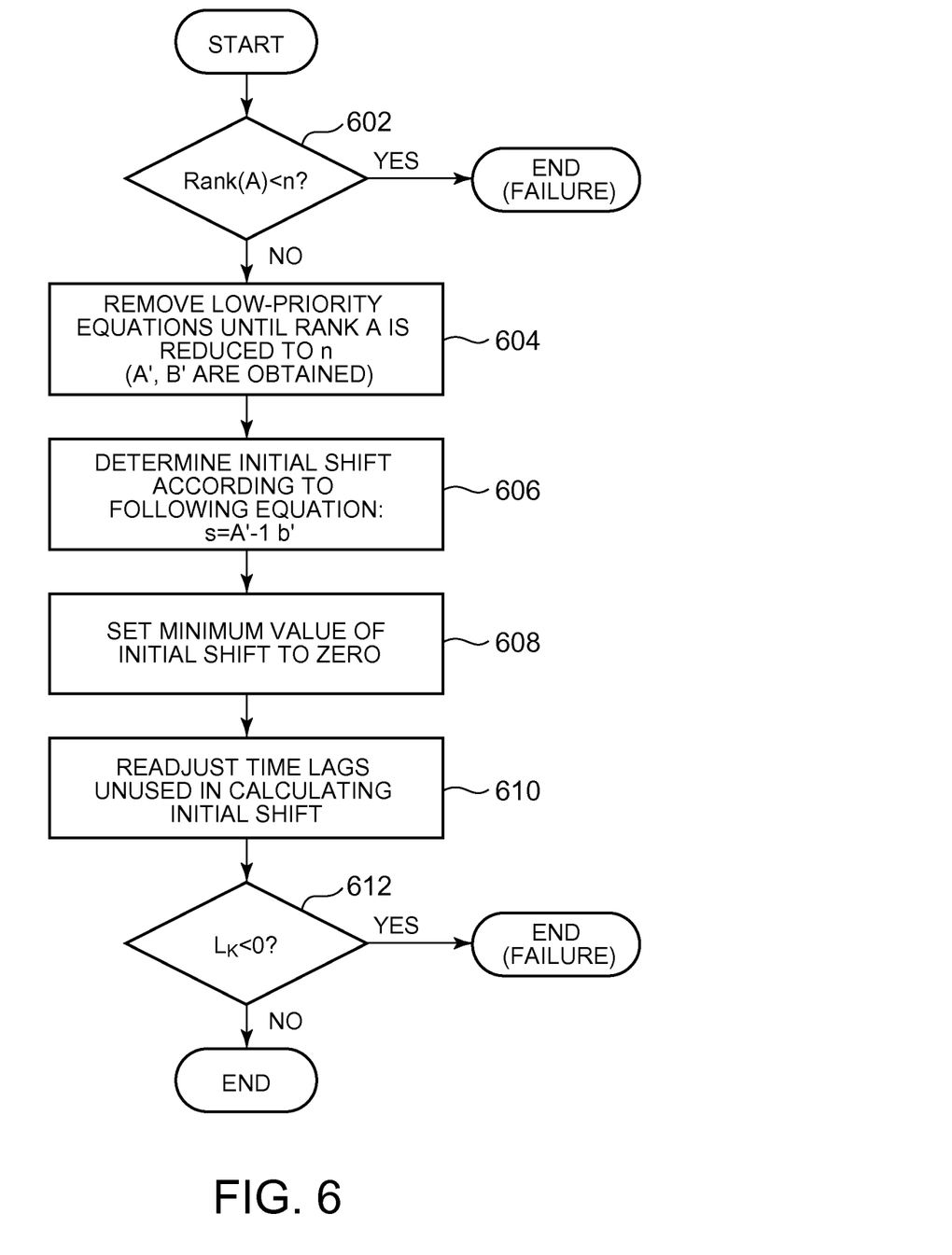
FIG. 6 is a flowchart showing processing performed by a shift amount calculating module.

Referring to the flowchart of FIG. 6, the shift amount calculating module 410 determines in step 602 whether the rank of matrix A of the left side of the simultaneous equations is smaller than n. If so, the processing is ended unsuccessfully. When the rank is smaller than n, since it means that connections between logical processes are so insufficient that an isolated island of logical process appears on the connections in FIG. 5, it is easy for the designer of the coupled simulation to make corrections.

If the rank of matrix A is n or more, the shift amount calculating module 410 removes low-priority equations corresponding to logical processes included in the preference 414 in step 604 until the rank of matrix A becomes n. As a result, an equation A's = b' is obtained.

In step 606, the shift amount calculating module 410 determines shift amount s from $s = A'^{-1} b'$. In this case, an inverse matrix to A' is not necessarily calculated, and any existing method can be used as a technique of numerical calculation on a computer, such as Gaussian elimination or Gauss-Seidel method.

In step 608, the shift amount calculating module 410 sets the minimum value of the initial shift amount to zero by processing, for example, the following equation:

$$S_k := S_k - \min_{1 \leq i \leq n} (S_i) \quad [\text{Math 3}]$$

In step 610, the shift amount calculating module 410 readjusts time lags unused in calculating the initial shift according to the following formula:

If $L_{ij} > L_{ji} + 2(S_j - S_i), L_{ij} = L_{ji} + 2(S_j - S_i)$, or if not, $L_{ji} := L_{ij} + 2(S_i - S_j)$.

As a result of this adjustment, if even one of the $L_{ij}$ values becomes negative, the calculation processing is ended as an error as a result of determination in step 612 (here, $L_{ij}$ is translated into $L_k$). In this case, the designer of the coupled simulation is required to carry out an operation such as to reassign priority.

Figure 7:
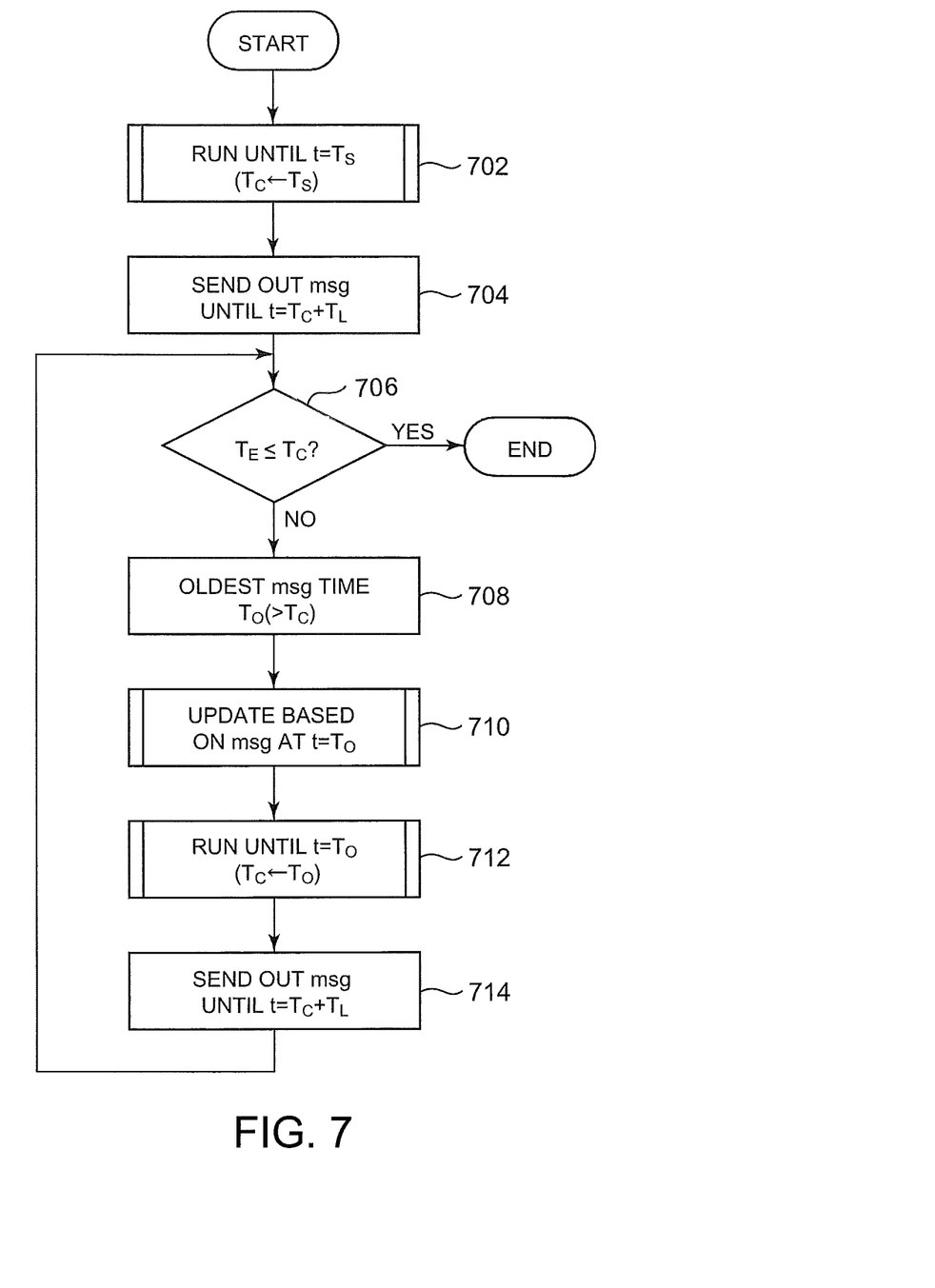
FIG. 7 is a flowchart showing processing performed by a default local scheduler.

Next, processing performed by the local scheduler in each logical process will be described with reference to a flowchart of FIG. 7. Before describing the flowchart of FIG. 7, the following gives the definitions of times used:

$T_C$: Current Local Time
$T_S$: Initial Shift
$T_O$: Oldest Time in Queue
$T_L$: Time Lag to Destination
$T_E$: Ending Time of Simulation In FIG. 7, the local scheduler runs in step 702 until $t = T_S$. As a result, $T_C$ becomes $T_S$.

In step 704, the local scheduler sends out messages (msg) until $t = T_C + T_L$.

In step 706, the local scheduler determines whether $T_E \leq T_C$, and if so, the processing is ended.

If not $T_E \leq T_C$, the local scheduler acquires the oldest message time in step 708.

In step 710, the local scheduler makes an update based on a message at $t=T_O$.

In step 712, the local scheduler runs until $t=T_O$. As a result, TC becomes $T_O$.

In step 714, the local scheduler sends messages until $t=T_C + T_L$ and returns to step 706.

Next, operation for executing the simulation according to the present invention will be described. First, for the sake of simplicity, processing based only on two logical processes will be described.

In this invention, a conservative synchronization technique using null message is assumed to prevent the logical processes from waiting each other's events and hence causing deadlock. The null message means a message including only the timestamp, which will be distinguished from the event message below.

In the above structure, the following preparations are made for the simulation:

(1) The user uses the simulation modeling tool 404 to construct a predetermined model and a simulator for executing the model step by step.

(2) The user writes connection information between simulators. The connection information is composed of the output port number of a simulator, the input port number of a destination simulator, the smallest time lag, and priority.

(3) The main program 402 reads the connection information to determine the initial shift amount of each simulator.

(4) The main program 402 sets the initial shift value and the simulation ending time in each local scheduler, and links with the step-by-step execution module of each simulator to generate a thread execution module.

(5) The main program 402 runs the thread execution module and waits for completion thereof.

Figure 8:
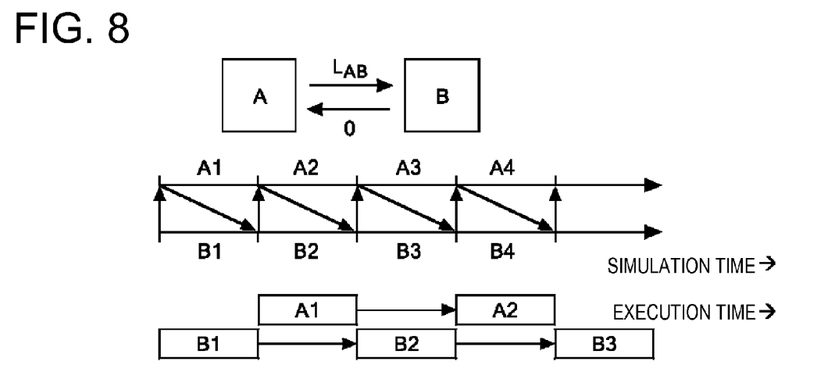
FIG. 8 is a diagram showing the operation of logical processes without initial shift.

Here, operation for running logical processes when there is a time lag of $L_{AB} > 0$ involved in sending a message from logical process A to logical process B, and the time lag of sending a message from logical process B to logical process A is zero as shown in FIG. 8 is taken as an example. In the prior art, both logical process A and logical process B send null messages to each other at the same time at the start of the simulation time, and as a result, logical process A and logical process B run sequentially as B1→A1→B2→as shown from the need to keep the local causality in each logical process during the execution time, making it impossible to speed up the execution time.

Figure 9:
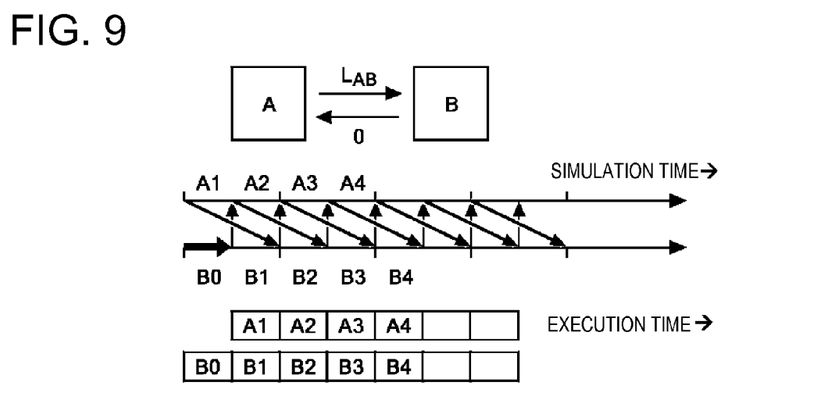
FIG. 9 is a diagram showing the operation of logical processes with initial shift.

Therefore, according to the present invention, logical process B is executed to make initial shift by an amount of $L_{AB}/2$ as shown in FIG. 9 to run logical process A and logical process B in parallel, and this can speed up the execution time. In FIG. 9, the initial shift is expressed as B0.

Figure 10:
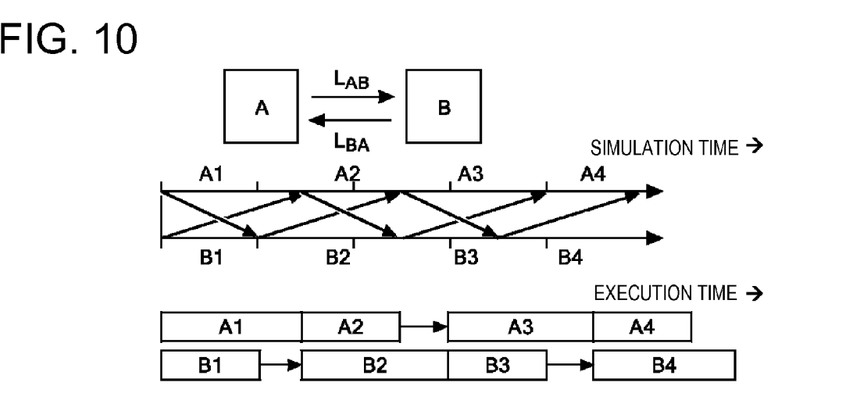
FIG. 10 is a diagram showing the operation of logical processes without initial shift.
Figure 11:
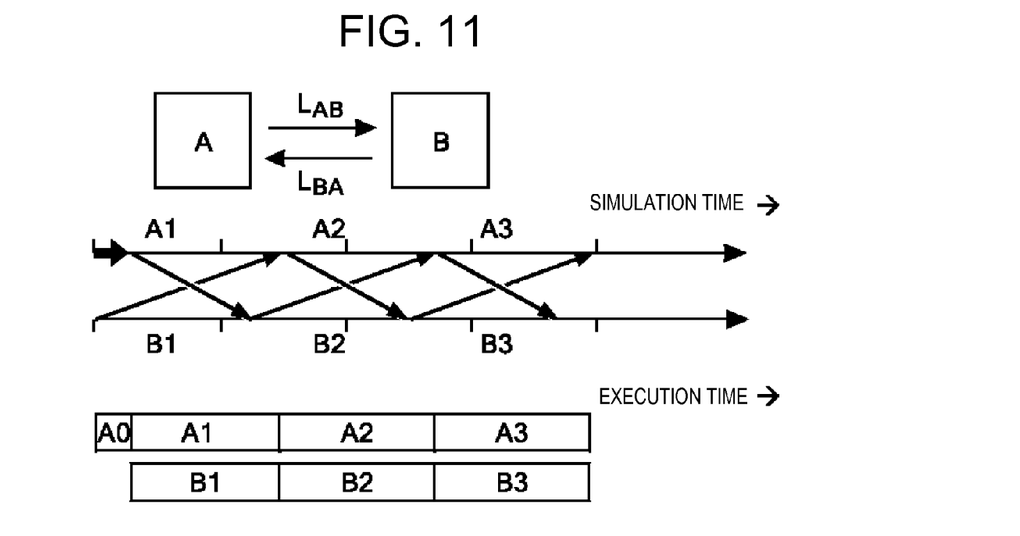
FIG. 11 is a diagram showing the operation of logical processes with initial shift.

In the example of FIG. 10, since both the time lag $L_{AB}$ of sending out a message from logical process A to logical process B and the time lag $L_{BA}$ of sending out a message from logical process B to logical process A are not zero, logical process A and logical process B can be executed in parallel. However, if $L_{BA} > L_{AB} > 0$, logical process A can be executed to make initial shift by an amount of $(L_{BA} - L_{AB})/2$ as shown in FIG. 11 to further improve the performance of parallel execution, thereby increasing the execution time. In FIG. 11, the initial shift is expressed as A0.

Figure 12A:
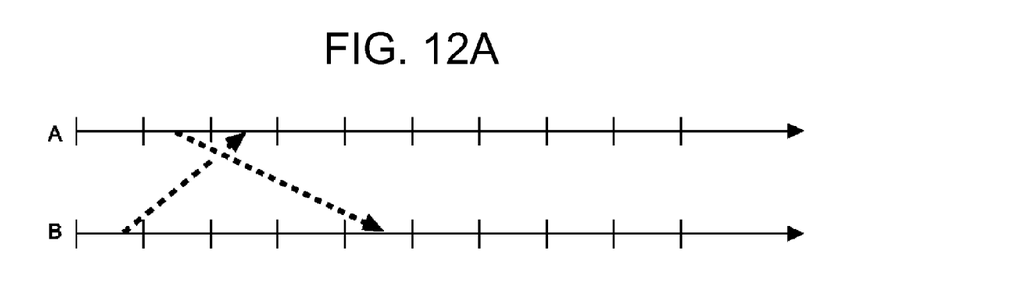
FIG. 12A shows a relationship between event message and null message that are sent by logical processes A and B to each other along a simulation time.
Figure 12B:
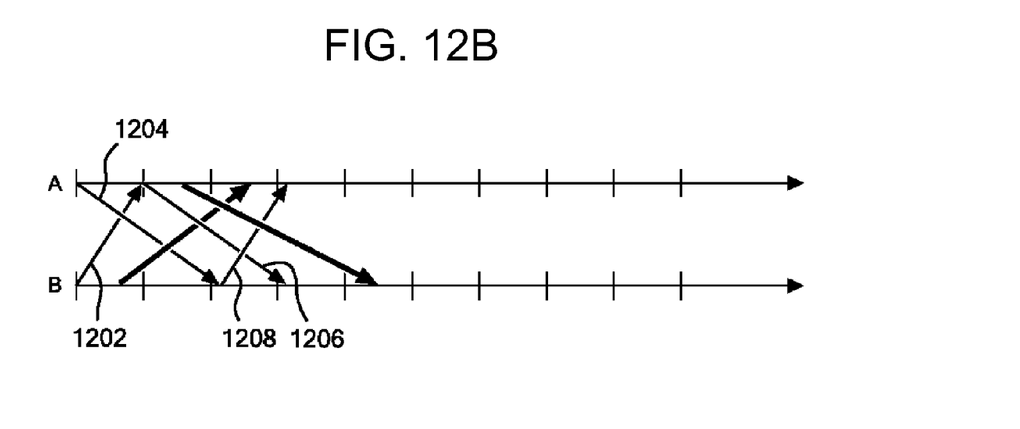
FIG. 12B shows a resulting relationship between event message and null messages that are sent by logical processes A and B to each other after adding a smallest time lag to the simulation time.

FIG. 12A shows a state in which logical processes A and B send events to each other along the simulation time. However, since both cannot predict at which time each event is delivered, they cannot start running and hence are deadlocked. In response to this, if both send each other null messages 1202, 1204, 1206, and 1208 with the smallest time lag added to the current simulation time, both can proceed with the processing as shown in FIG. 12B and hence receive each event message at an expected time.

The rules for sending a null message and an event message are as follows:

(1) The timestamp of each message is increased on each communication channel.

(2) Only a logical process located near the logical process sending the message responds to the message.

(3) An event message is sent immediately before the next null message is sent.

(4) No null message is sent in response to each event message.

The timestamp of an event message is set to be later than the timestamp of a null message sent immediately after the event message. This is because the timestamp of the null message is the earliest time to reach the correspondent logical process based on the specified time lag. This is indicated in FIG. 12 as the event message with a slope gentler than that of the null message.

The execution technique in which processing shifts of the present invention are set can be applied among more logical processes as well as between a pair of logical processes. FIG. 13 shows an example in which this technique is applied to three logical processes A, B, and C.

Figure 13A:
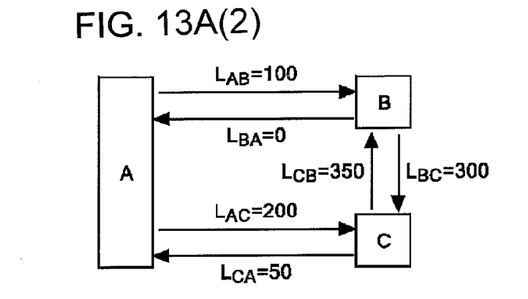
Figure 13B:
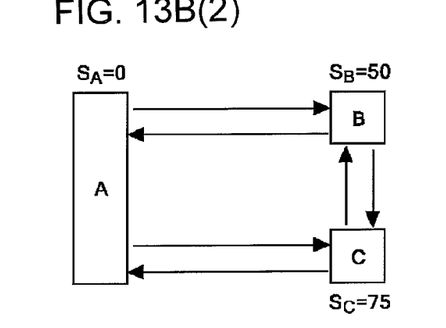

Particularly, FIG. 13A(2) shows example processing shifts (time lag data) among three processes A, B and C. In this example, if $L_{AB}=100$ (hereinafter, the unit is ms), $L_{BA}=0$, LBC=300, $L_{CB}=350$, $L_{AC}=200$, and $L_{CA}=50$ as shown in FIG. 13A(2), the corresponding operation chart will be as shown in FIG. 13A(1).

According to the present invention, the initial shift amount of each logical process is calculated based on the above-mentioned time lag data. As a result, as shown in FIG. 13B(2), it is determined that the initial shift amount of logical process A is $S_A=0$, the initial shift amount of logical process B is $S_B=50$, and the initial shift amount of logical process C is $S_C=75$.

Thus, logical process B is run with the initial shift as indicated by reference numeral 1302, and logical process C is run with the initial shift as indicated by reference numeral 1304. As a result, it is found that the execution speed is improved in the operation chart of FIG. 13B(2) compared with the operation chart of FIG. 13A(1).

FIG. 14 shows an example in which the technique is applied to three logical processes A, B, and C having different time lags.

Figure 14A:
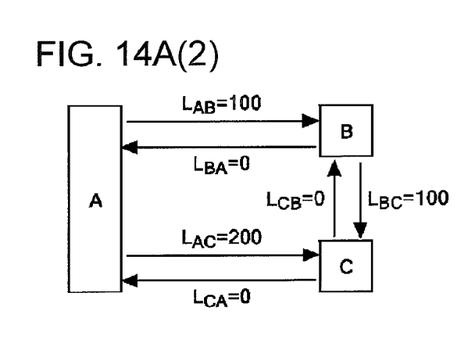
Figure 14B:
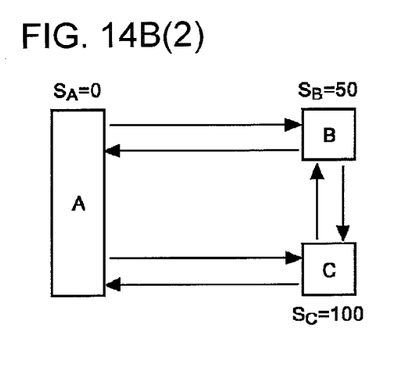

Particularly, FIG. 14A(2) shows example processing shifts (time lag data) among three processes A, B and C. In this example, if $L_{AB}=100$, $L_{BA}=0$, $L_{BC}=100$, $L_{CB}=0$, $L_{AC}=200$, and $L_{CA}=0$ as shown in FIG. 14A(2), the corresponding operation chart will be as shown in FIG. 14A(1).

Next, the initial shift amount of each logical process is calculated based on the above-mentioned time lag data. As a result, as shown in FIG. 14B(2), it is determined that the initial shift amount of logical process A is $S_A=0$, the initial shift amount of logical process B is $S_B=50$, and the initial shift amount of logical process C is SC=100.

Thus, logical process B is run with the initial shift as indicated by reference numeral 1402, and logical process C is run with the initial shift as indicated by reference numeral 1404. As a result, it is found that the execution speed is improved in the operation chart of FIG. 14B(1) compared with the operation chart of FIG. 14A(1).

Referring next to FIG. 15 and FIG. 16, the operation between two logical processes different in execution speed will be described. Here, cases where the initial shift is not one half will also be shown.

FIG. 15 shows that the execution speed of logical process A is higher than the execution speed of logical process B.

Figure 15A:
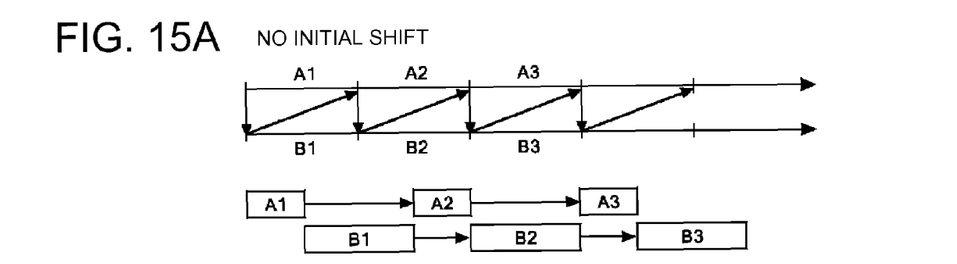
FIG. 15A shows the operation in the conventional case without initial shift.
Figure 15B:
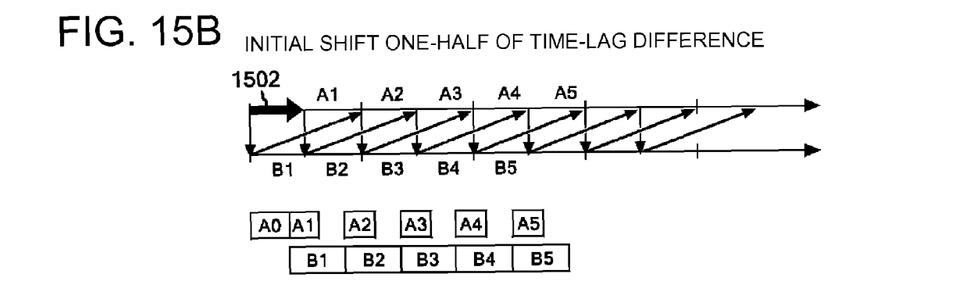
FIG. 15B shows the operation when the initial shift is one-half of the time-lag difference.

FIG. 15A shows the operation in the conventional case without initial shift, and FIG. 15B shows the operation when the initial shift is one-half of the time-lag difference. In FIG. 15B, the initial shift is indicated by reference numeral 1502.

Figure 15C:
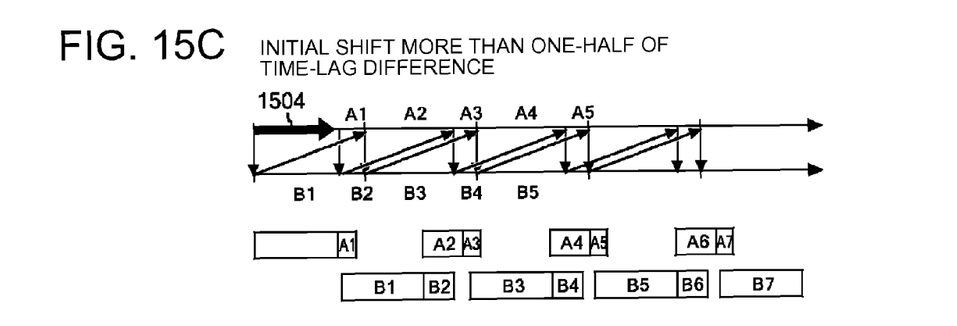
FIG. 15C shows the operation when the initial shift is more than one-half of the time-lag difference.
Figure 15D:
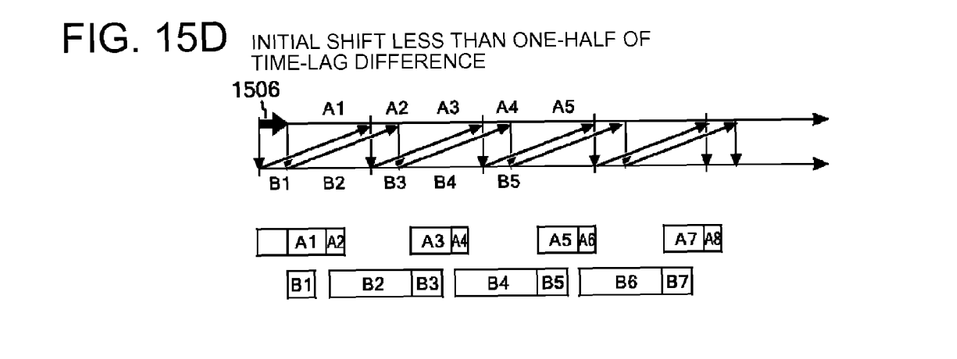
FIG. 15D shows the operation when the initial shift is less than one-half of the time-lag difference.

Further, FIG. 15C shows the operation when the initial shift is more than one-half of the time-lag difference, and FIG. 15D shows the operation when the initial shift is less than one-half of the time-lag difference. In FIG. 15C, the initial shift is indicated by reference numeral 1504, and in FIG. 15D, the initial shift is indicated by reference numeral 1506.

FIG. 16 shows that the execution speed of logical process A is lower than the execution speed of logical process B.

Figure 16A:
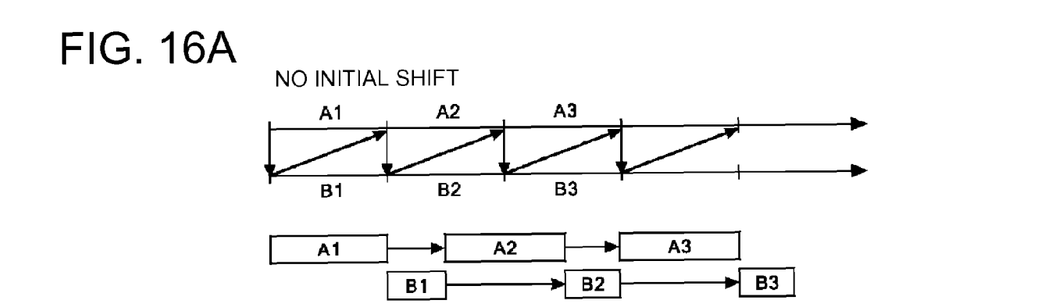
Figure 16B:
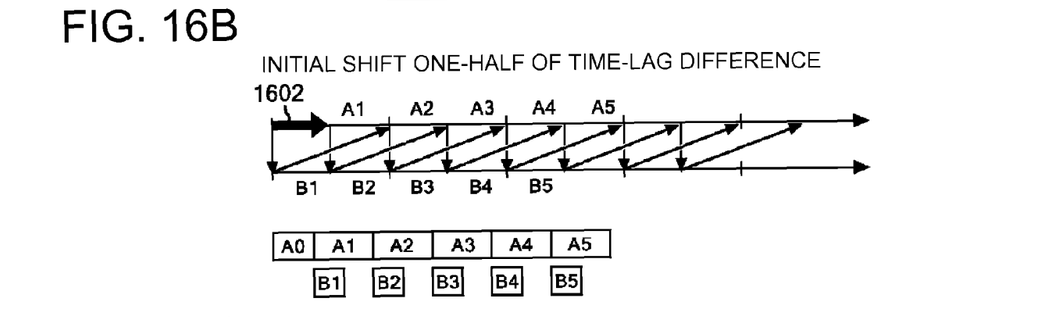
FIG. 16B shows the operation of processes A, B when the initial shift is one-half of the time-lag difference.

FIG. 16 A shows the operation in the conventional case without initial shift, and FIG. 16B shows the operation when the initial shift is one-half of the time-lag difference. In FIG. 16B, initial the initial shift is indicated by reference numeral 1602.

Figure 16C:
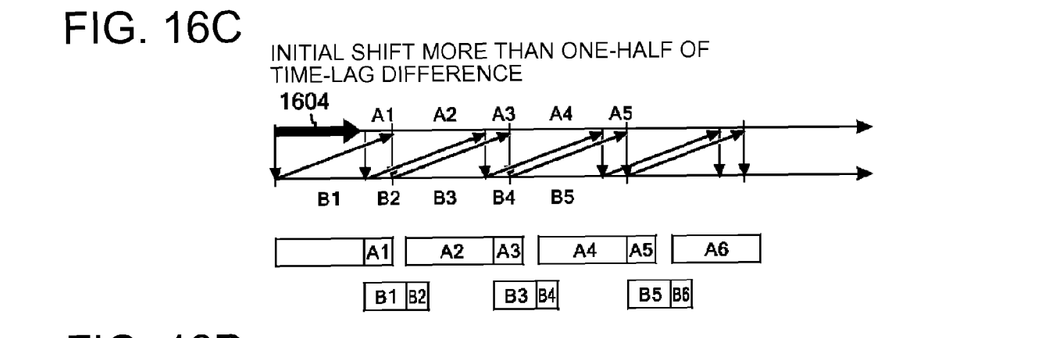
FIG. 16C shows the operation of processes A, B when the initial shift is more than one-half of the time-lag difference.
Figure 16D:
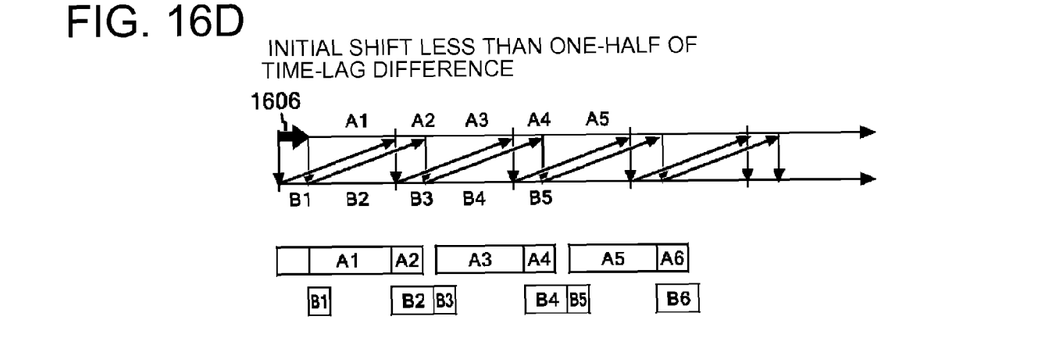
FIG. 16D shows the operation of processes A, B when the initial shift is less than one-half of the time-lag difference.

Further, FIG. 16C shows the operation when the initial shift is more than one-half of the time-lag difference, and FIG. 16D shows the operation when the initial shift is less than one-half of the time-lag difference. In FIG. 16C, the initial shift is indicated by reference numeral 1604, and in FIG. 16D, the initial shift is indicated by reference numeral 1606.

These indicate that, though the case of the initial shift one-half of the time-lag difference seems best, the case the initial shift more than one-half of the time-lag difference and the case of the initial shift less than one-half of the time-lag difference can obtain the results of improvement in simulation speed as well.

Therefore, some more consideration will be given to this as follows: When shift rates x other than one half are taken, $A:B=x:(1-x)$ and $A:B=(1-x):x$ appear alternately as the ratios of the simulation time lengths. Here, if the speed of logical process A is expressed as $V_A$, the speed of logical process B is expressed as $V_B$, and the relation is $V_B>V_A$, the simultaneous inequalities hold: $x/V_A>(1-x)/V_B$ and $(1-x)/V_A>V_B$. In solving the simultaneous inequalities, if $x_0$ takes on values smaller than 0.5, the solutions will be $x_0<x<1-x_0$. Thus, $x=\frac{1}{2}$ always falls within the range as long as there is any solution. When the execution speeds of logical processes are known, values other than $x=\frac{1}{2}$ can be taken properly, while when the speeds are indefinite, $x=\frac{1}{2}$ is the most secure solution. This is the reason why the initial shift one-half of the time-lag difference is desired.

In other words, according to the present invention, the suitable initial shift is one half of the time-lag difference. However, the suitable initial shift is not limited thereto, and an appropriate initial shift smaller than the time-lag difference can be selected depending on the ratio between the execution speeds of logical processes communicating with each other.

While the specific embodiment of the present invention is described above in connection with two or more automotive simulation systems, it will be understood by those skilled in the art that the present invention is not limited to such a specific embodiment and applicable to a simulation system for the control system of a common electronic machine.

The configuration for carrying out the present invention is not also limited to the architecture, operating system, and the like of a specific processor.

Further, the aforementioned embodiment is described by taking MATLAB®/Simulink® as an example, but it is not limited to this. It will be understood by those skilled in the art that the present invention is applicable to any modeling tool.

DESCRIPTION OF REFERENCE NUMERALS 304a, 304b, . . . , 304n CPU
306 Main Memory
308 Hard Disk Drive
408 Connection Information File
410 Shift Amount Calculating Module

The invention claimed is:

1. A computer implemented method of operating a simulation system having a plurality of logical processes that communicate with each other to proceed with the processing, the method comprising:
   defining a time lag of sending a message from a given first logical process to a second logical process communicating with the first logical process as a first time lag,
   defining a time lag of sending a message from the second logical process to the first logical process as a second time lag,
   determining whether the first time lag is greater than the second time lag, and
   running the second logical process if the first time lag is greater than the second time lag by an amount of predetermined initial shift smaller than a difference between the first time lag and the second time lag before commencing a simulation to run the first logical process and the second logical process in parallel on the computer.

2. The method of operating the simulation system according to claim 1, wherein the predetermined initial shift is one-half of the difference between the first time lag and the second time lag.

3. The method of operating the simulation system according to claim 1, further comprising a step of running the logical processes in parallel while sending a null message periodically with timing displaced by the amount of initial shift between the logical processes.

4. The method of operating the simulation system according to claim 1, wherein the second time lag is zero and the first time lag is larger than zero.

5. The method of operating the simulation system according to claim 4, wherein the first logical process is an ECU emulator and the second logical process is a plant simulator.

6. A computer implemented method of operating a simulation system having a plurality of logical processes communicate with each other to proceed with the processing, the method comprising:
   determining a relative shift amount between two logical processes communicating with each other based on a value of difference between a value of time lag of communication from one to another and a value of time lag of communication from the another to the one between the two logical processes;
   forming simultaneous linear equations for determining a shift amount based on a communication relationship between the logical processes; and
   setting an initial shift to each individual logical process to run the logical processes according to a solution of the simultaneous linear equations.

7. The method of operating the simulation system according to claim 6, wherein the relative shift amount is calculated as one-half of the difference between the value of time lag of communication from the one to the another and the value of time lag of communication from the another to the one.

8. The method of operating the simulation system according to claim 6, further comprising: reducing the number of equations when the solution of the simultaneous linear equations is indefinite.

9. The method of operating the simulation system according to claim 6, wherein the plurality of logical processes include an ECU emulator and a plant simulator.

10. The method of operating the simulation system according to claim 6, further comprising: running the logical processes in parallel while sending a null message periodically with timing displaced by the amount of initial shift between the logical processes.

11. A computer program product for operating a simulation system having a plurality of logical processes that communicate with each other by computer processing to proceed with the processing, said computer program product comprising:
a tangible non-transitory computer-readable media comprising computer-readable program instructions for causing a processor device of the simulation system to run a method comprising:
determining a relative shift amount between two logical processes communicating with each other based on a value of difference between a value of time lag of communication from one to another and a value of time lag of communication from the another to the one between the two logical processes;
forming simultaneous linear equations for determining a shift amount based on a communication relationship between the logical processes; and
setting initial shift to each individual logical process to run the logical processes according to a solution of the simultaneous linear equations.

12. The computer program product for operating the simulation system according to claim 11, wherein the relative shift amount is calculated as one-half of the difference between the value of time lag of communication from the one to the another and the value of time lag of communication from the another to the one.

13. The computer program product for operating the simulation system according to claim 11, causing the simulation system to further execute a step of reducing the number of equations when the solution of the simultaneous linear equations is indefinite.

14. The computer program product for operating the simulation system according to claim 11, wherein the plurality of logical processes include an ECU emulator and a plant simulator.

15. The computer program product for operating the simulation system according to claim 11, wherein the method further comprises: running the logical processes in parallel while sending a null message periodically with timing displaced by the amount of initial shift between the logical processes.

16. A simulation system having a plurality of logical processes communicate with each other by computer processing to proceed with the processing, the system comprising:
a memory device for storing computer readable instructions; and
a processor unit associated with the memory device, wherein the processor unit is programmed with said instructions to run a method comprising:
defining a time lag of sending a message from a given first logical process to a second logical process communicating with the first logical process as a first time lag,
defining a time lag of sending a message from the second logical process to the first logical process as a second time lag,
determining whether the first time lag is greater than the second time lag, and
running the second logical process if the first time lag is greater than the second time lag, by an amount of predetermined initial shift smaller than a difference between the first time lag and the second time lag before commencing a simulation to run the first logical process and the second logical process in parallel on the computer.

17. The simulation system according to claim 16, wherein the predetermined initial shift is one-half of the difference between the first time lag and the second time lag.

18. The simulation system according to claim 16, wherein the method further comprises:
running the logical processes in parallel while sending a null message periodically with timing displaced by the amount of initial shift between the logical processes.

19. The simulation system according to claim 16, wherein the second time lag is zero and the first time lag is larger than zero.

20. The simulation system according to claim 19, wherein the first logical process is an ECU emulator and the second logical process is a plant simulator.

* * * * *